Figure 1:
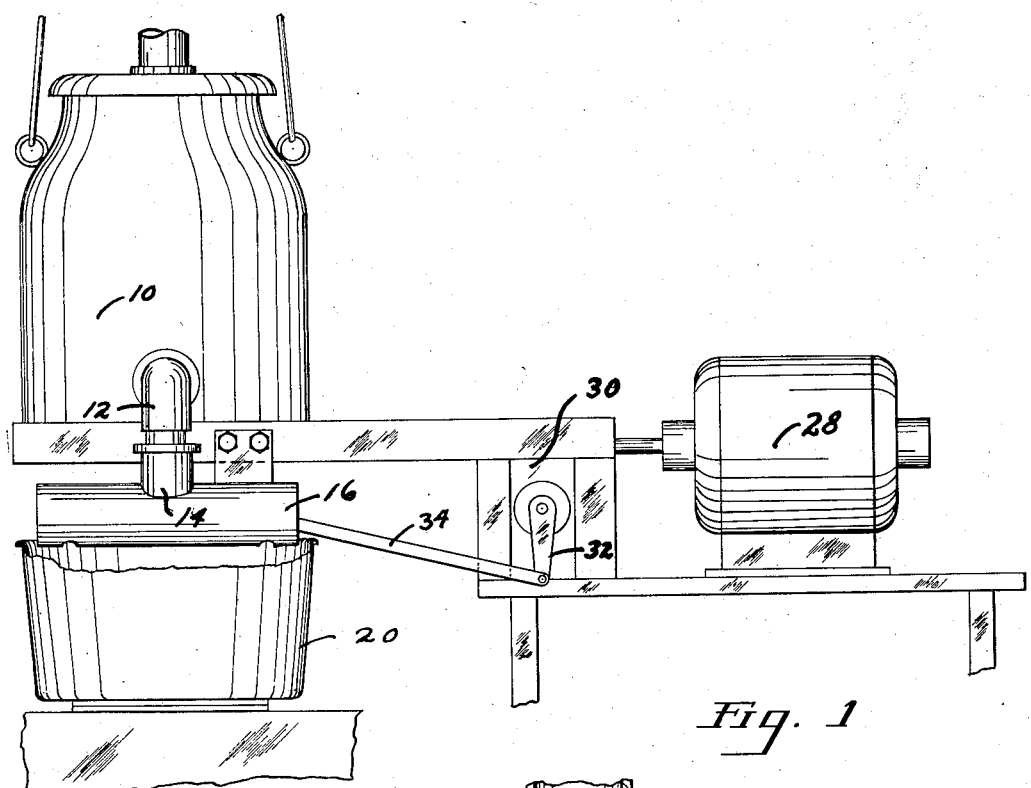

April 7, 1959 L. L. WHITCHER 2,880,700

MILK RELEASER

Filed May 20, 1957

INVENTOR
LEWIS L. WHITCHER

BY *Townsen P. Beaman*

ATTORNEY

2,880,700
MILK RELEASER

Lewis L. Whitcher, Somerset, Mich.

Application May 20, 1957, Serial No. 660,334

2 Claims. (Cl. 119—14.05)

The present invention relates to improvements in mechanism for the release of milk from a vacuum milking system without materially affecting the vacuum of the system. Reference may be had to United States Letters Patent No. 1,116,021 for the disclosure of a similar type of mechanism over which the present invention is deemed to be an improvement.

According to the invention, the milk is transferred and the vacuum broken by means of a reciprocating structure operating in a housing having a connection with the vacuum system through an inlet port in the wall thereof. The reciprocating structure defines with the inner wall of the housing a pair of chambers in tandem relation into which the milk is alternately fed and discharged, the discharge taking place through outlet ports located at opposite ends of the housing.

Thus, an object of the invention is to provide a mechanism of the type described in which the milk is released by being transferred lengthwise of a housing from an inlet area under vacuum to a discharge area at atmospheric pressure.

Another object of the invention is to provide an improved vacuum breaker for vacuum milking systems for effecting release of the milk wherein the breaker takes the form of a housing having a reciprocating chamber structure therein.

A further object of the invention is to provide a vacuum breaker for milking apparatus which is sanitary in construction, readily cleaned and comprises a set of heads spaced upon rod structure and reciprocated within a cylinder communicating with both the vacuum system and the atmosphere.

These and other objects and advantages residing in the construction, combination and arrangement of parts will more fully appear from the following detailed description and the appended claims.

Figure 2:
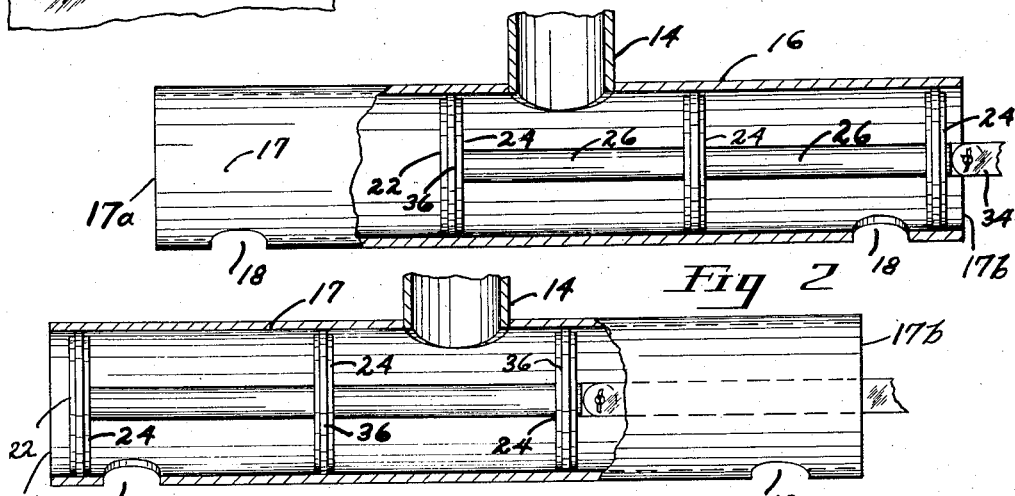
Figure 3:
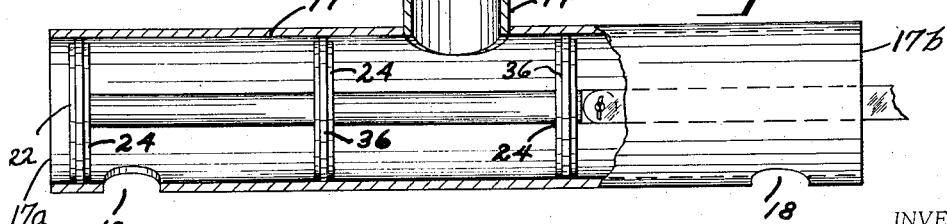

In the drawings,

Fig. 1 is a side-elevational view of a portion of a vacuum milking apparatus to which the present invention is shown applied, Fig. 2 is a side elevational view on a larger scale then shown in Fig. 1 of the vacuum breaker, partly shown in broken vertical section, and Fig. 3 is a view similar to Fig. 2 of the chamber structure of Fig. 2 shown in a different position.

In Fig. 1, milk from the vacuum supply 10 has a discharge 12 to which the central inlet port 14 of the vacuum breaker 16 may be connected in any suitable manner.

The vacuum breaker 16 is shown in the form of a tubular section or housing 17 shown open at both ends 17a, 17b to facilitate cleaning. In practice, the ends 17a, 17b may be enclosed with suitable sanitary caps which are removable for cleaning and disassembling purposes. Discharge ports 18 are provided at opposite ends of the breaker 16 for discharge of the milk released by the breaker 16. As shown, the breaker 16 is positioned within the milk handling structure 20. A transfer chamber structure 22 has a sealing and sliding fit within the housing 17. As shown, this structure is defined by adjacent pairs of spaced heads 24 carried upon a suitable spacing rod structure 26. It will be understood that the chambers defined between the adjacent pairs of heads 24 have a lesser length than the distance between the ports 18 and the port 14. This is to avoid communication between the ports 18 and 14 through the chambers defined between the heads 24.

Any suitable means may be employed to reciprocate the structure 22 in the housing 17. In the illustrated embodiment, an electric motor 28 is connected to a gear box 30 and rotates the crank arm 32 connected to the pitman 34 which is in turn connected to one end of the structure 22.

It will be readily appreciated that my improved vacuum breaker may be readily disassembled and cleaned. By using spring tension rings 36 in the heads 24 for providing a sealing and sliding fit, all in a well known manner, long leak-proof service of the mechanism is assured.

Having thus described my invention, what I claim is new and desire to be covered by Letters Patent is:

1. In combination with a vacuum milk receiver having a milk discharge outlet, a milk releasing means comprising an elongated housing having an inlet means connected to said discharge outlet of said milk receiver, said releasing means being provided with at least one outlet means axially spaced from said inlet means, a reciprocating piston rod within said releasing means having spaced therealong a pair of pistons, said pistons being spaced apart a distance less than the distance between said inlet and said outlet means whereby reciprocation of said piston and piston rod alternately places the chamber within said receiver defined by said pistons in communication with said inlet and outlet means.

2. In combination with a vacuum milk receiver as in claim 1 wherein said milk releasing means is provided with a pair of outlet means axially disposed on opposite sides of said inlet means and said piston rod is provided with three pistons whereby two reciprocable chambers are defined within said releasing means adapted to alternately communicate with their respective outlet means.

References Cited in the file of this patent

UNITED STATES PATENTS

| | | |
|---|---|---|
| 1,116,021 | Cornish | Nov. 3, 1914 |
| 2,453,553 | Tansley | Nov. 9, 1948 |